(12) United States Patent
Ali et al.

(10) Patent No.: US 10,387,527 B2
(45) Date of Patent: Aug. 20, 2019

(54) GLOBAL FILTERING ACROSS HETEROGENEOUS DATASETS

(71) Applicant: International Business Machines Corporation, Armonk, NY (US)

(72) Inventors: Mustansir Ali, Hornsby (AU); Bobby Joseph, Ashfield (AU); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 15/046,854

(22) Filed: Feb. 18, 2016

(65) Prior Publication Data
US 2017/0242892 A1   Aug. 24, 2017

(51) Int. Cl.
*G06F 9/451*   (2018.01)
*G06F 16/958*   (2019.01)

(52) U.S. Cl.
CPC ............ *G06F 16/958* (2019.01); *G06F 9/451* (2018.02)

(58) Field of Classification Search
CPC ........... G06F 17/30522; G06F 17/3056; G06F 17/30563; G06F 17/3089; G06F 9/451
See application file for complete search history.

(56) References Cited

U.S. PATENT DOCUMENTS

| | | | |
|---|---|---|---|
| 8,341,163 B2 | 12/2012 | Folting et al. | |
| 8,880,459 B2 | 11/2014 | Handy et al. | |
| 8,972,421 B2 | 3/2015 | Vishnubhatta et al. | |
| 2008/0162209 A1 | 7/2008 | Gu et al. | |
| 2012/0192112 A1* | 7/2012 | Garrison | ............... G06F 3/0482 715/825 |
| 2013/0031499 A1 | 1/2013 | Vishnubhatta et al. | |
| 2013/0239012 A1 | 9/2013 | Barak | |
| 2016/0103886 A1* | 4/2016 | Prophete | ........... G06F 17/30994 707/722 |

OTHER PUBLICATIONS

Jazz for Service Management Version 1.1.2.1 Readme, Aug. 28, 2015, These notes describe Jazz™ for Service Management Version 1.1.2.1, including how to download and install, any prerequisites, known issues, and link to fix list, Released Aug. 28, 2015, evidence of Grace Period Use or Sale.

(Continued)

*Primary Examiner* — Taelor Kim
(74) *Attorney, Agent, or Firm* — Christopher K. McLane

(57) ABSTRACT

Aspects of the present invention disclose a method, computer program product, and system for generating global widget filters. The method includes identifying, by one or more computer processors, one or more widgets on a computing device. The method further includes identifying, by one or more computer processors, a new filter for the one or more widgets on the computing device. The method further includes identify, by one or more computer processes, one or more existing filters for the one or more widgets. The method further includes determine, by one or more computer processors, if the new filter is relevant to the one or more widgets. The method further includes in response to determining if the new filter is relevant to the one or more widgets, generating, by one or more computer processors, a merged filter for the relevant one or more widgets.

20 Claims, 4 Drawing Sheets

(56) References Cited

OTHER PUBLICATIONS

"Discover", Kibana User Guide [42], © 2015. All Rights Reserved—Elasticsearch, 9 pages, <https://www.elastic.co/guide/en/kibana/current/discover.html#set-time-filter>.

"ISO 8601", From Wikipedia, the free encyclopedia, This page was last modified on Nov. 16, 2015, 7 pages, <https://en.wikipedia.org/wiki/ISO_8601#Time_intervals>.

"Jazz for Service Management", IBM developerWorks, printed on Nov. 23, 2015, 4 pages, <https://www.ibm.com/developerworks/community/blogs/69ec672c-dd6b-443d-add8-bb9a9a490eba?lang=en>.

"Jazz for Service Management Version 1.1.2.1 Readme", IBM Product Announcement, Published Aug. 28, 2015, 8 pages, <http://www-01.ibm.com/support/docview.wss?uid=swg24040447>, Grace Period Disclosure.

\* cited by examiner

GLOBAL FILTERING ACROSS HETEROGENEOUS DATASETS

BACKGROUND OF THE INVENTION

The present invention relates generally to user interface widgets, and more particularly to global filtering of widgets across heterogeneous datasets.

Computer widgets (commonly called widgets) are interactive virtual tools that provide single-purpose services, such as showing the user the latest news, the current weather, the time, a calendar, a dictionary, a map program, a calculator, photo viewers, or even a language translator, among other things. Widgets can provide or augment the graphical shell. In some instances widgets can intercommunicate and show related metrics.

A widget can represent parts of a graphical user interface (GUI), which the user can use to interact with the program to which the GUI belongs to. Widgets may be implemented like subroutines. Widget toolkits and software frameworks contain them in software libraries so that programmers can use them to build GUIs for their programs.

SUMMARY

Aspects of the present invention disclose a method, computer program product, and system for generating global widget filters. The method includes identifying, by one or more computer processors, one or more widgets on a computing device. The method further includes identifying, by one or more computer processors, a new filter for the one or more widgets on the computing device. The method further includes identify, by one or more computer processes, one or more existing filters for the one or more widgets. The method further includes determine, by one or more computer processors, if the new filter is relevant to the one or more widgets. The method further includes in response to determining if the new filter is relevant to the one or more widgets, generating, by one or more computer processors, a merged filter for the relevant one or more widgets.

DETAILED DESCRIPTION

In management information systems, a dashboard provides a unified and easy to read real-time graphical user interface (GUI) showing the current status and historical trends of an organization's resources or assets. Dashboards allow a user to assess current conditions as well as make instantaneous and informed decisions quickly. Embodiments of the present invention recognize that the underlying process of gathering and accumulating data from different sources is quite complex. A user interface is a mash up and the data comes from heterogeneous data sources. Embodiments of the present invention recognize that global filtering is a problem for a dashboard.

Implementation of embodiments of the invention may take a variety of forms, and exemplary implementation details are discussed subsequently with reference to the Figures.

Figure 1:
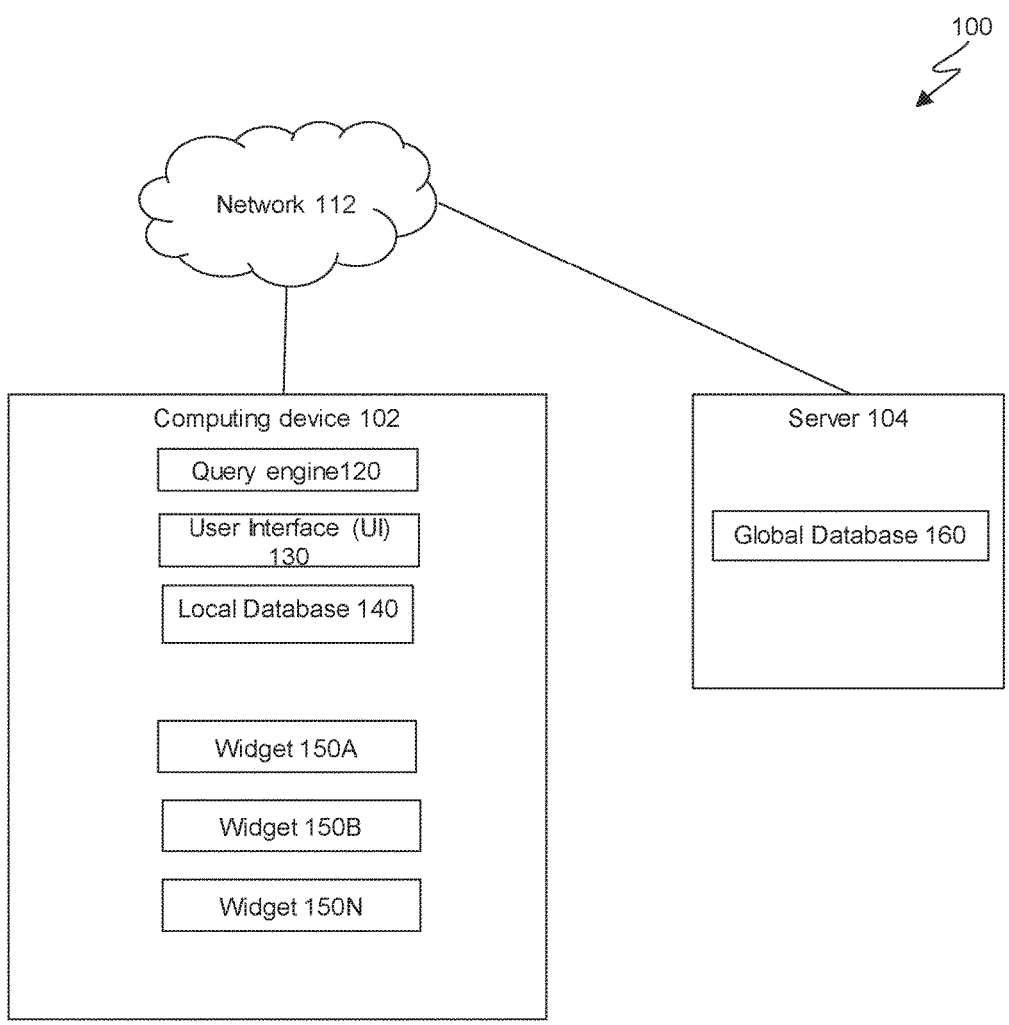
FIG. 1 is a functional block diagram illustrating a distributed data processing environment, in accordance with one embodiment of the present invention.

The present invention will now be described in detail with reference to the Figures. FIG. 1 is a functional block diagram of computing system 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted environment, computing system 100 includes computing device 102 and server 104 connected to network 112. Network 112 may be a local area network (LAN), a wide area network (WAN), such as the Internet, a cellular data network, any combination thereof, or any combination of connections and protocols that will support communications between computing device, in accordance with embodiments of the invention. Network 112 may include wired, wireless, or fiber optic connections. Network 112 includes one or more wired and/or wireless networks that are capable of receiving and transmitting data, voice, and/or video signals, including multimedia signals that include voice, data, and video information. Computing system 100 may have other devices not shown that are able to communicate with computing device 102 via network 112.

Computing device 102 may be any computing device, such as a desktop computer, a laptop computer, a netbook computer, a smart phone, or a tablet computer. In general, computing device 102 may be any electronic device or computing system capable of processing program instructions, for sending and receiving data with network 112. In the depicted embodiment, computing device 102 contains query engine 120, user interface (UI) 130, local database 140, and widgets 150 A, B, and N. In some embodiments, computing device 102 may include additional programs, databases, or interfaces which are not depicted. In other embodiments, computing device 102 may include query engine 120, user interface (UI) 130, local database 140, and widgets 150 A, B, and N, and/or other components, as depicted and described in further detail with respect to FIG. 4.

In depicted computing system 100, query engine 120 resides on computing device 102. Query engine 120 creates global filters for widgets on computing device 102. A widget is an interactive virtual tool that provides single-purpose services such as showing the user the latest news, the current weather, the time, a calendar, a dictionary, a map program, a calculator, photo viewers, or a language translator, among other things known in the art. In some instances widgets can intercommunicate and show related metrics. In some embodiments, query engine 120 may be located on another computing device, such as server 104, and filter widgets on a separate computing device such as computing device 102. In other embodiments, query engine 120 may filter widgets across multiple devices. For example, query engine 120 is located on server 104 and there are multiple widgets located on multiple computing devices (not depicted). In another example, a user may have multiple devices (e.g., a phone, laptop, and tablet) with multiple widgets on each device. In some embodiments, a global filter may work with multiple different widgets regardless of the data source. In this example, query engine 120 may be located on one of the devices or another device (e.g., server 104) and communicate and filter a user selected amount of widgets or all widgets associated with a user account via network 112. Query engine 120 is depicted and described in further detail in FIGS. 2, 3 and 4.

In depicted computing system 100, user interface (UI) 130 resides on computing device 102. UI 130 is a computer program that provides an interface between a user and computing device 102. A user interface refers to the information, such as graphic, text, and sound, a program presents to a user, and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements by the user.

Local database 140 may be a repository that may be written to and/or read by query engine 120. In an embodiment, local database 140 is an organized collection of data. In some embodiments, filters, metadata pertaining to widgets, metadata pertaining to filters, user preferences, widget features, and other information may be stored in local database 140. In various embodiments, other programs (not depicted) or other computing devices (not depicted) may store information related to widgets in local database 140. Query engine 120 may then access local database 140 to identify information stored by other programs or devices. In yet other embodiments, local database 140 may comprise multiple databases that may be located on computing device 102, and/or other computing devices (not depicted) but connected via network 112. In other embodiments, local database 140 may reside on a server, another computing device (not depicted), or independently as a standalone database that is capable of communicating with computing device 102 via network 112.

Widgets 150 A, B, and N represent a collection of widgets located on computing device 102. Widget 150 N may represent any number of widgets. A widget is an interactive virtual tool that provides single-purpose services such as showing the user the latest news, the current weather, the time, a calendar, a dictionary, a map program, a calculator, photo viewers, or even a language translator, among other things known in the art. In some instances widgets can intercommunicate and show related metrics. Widgets 150 A, B, and N may be different types of widgets such as tables, lists, gauges, etc. Widget 150 A, B, and N are a depicted representation of three widgets located on computing device 102, but in some embodiments, there may be more widgets located on computing device 102. In other embodiments, Widgets 150 A, B, and N may be located on different computing devices (not depicted), but can communicate with query engine 120 via network 112.

Server 104 may be a management server, a web server, or any other electronic device or computing system capable of processing program instructions, receiving data and sending data. In some embodiments, server 104 may be a laptop computer, a tablet computer, a netbook computer, a personal computer (PC), a desktop computer, or any programmable electronic device capable of communicating with computing device 102 via network 112. In other embodiments, server 104 may represent a server computing system utilizing multiple computers as a server system, such as in a cloud computing environment. In the depicted embodiment, server 104 is connected to computing device 102 through network 112. Server 104 may include global database 160, and/or other components, as depicted and described in further detail with respect to FIG. 4. In other embodiments, server 104 may contain query engine 120. In such an embodiment, query engine 120 may have multiple users, with each user having a set of widgets and filters for query engine 120 to manage.

Global database 160 may be a repository that may be written to and/or read by query engine 120. In an embodiment, global database 160 is an organized collection of data. In some embodiments, filters, metadata pertaining to widgets, metadata pertaining to filters, user preferences, widget features, and other information may be stored in global database 160. In various embodiments, other programs (not depicted) or other computing devices (not depicted) may store information related to widgets in global database 160. Webpages or servers connected to widgets (e.g., widgets 150 A, B, and N) on computing device 102 may store information in global database 160. Query engine 120 may then access global database 160 to identify information stored by other programs or devices. In yet other embodiments, global database 160 may comprise multiple databases that may be located on server 104, and/or other computing devices (not depicted) but connected via network 112. In other embodiments, global database 160 may reside on another server, another computing device (not depicted), or independently as a standalone database that is capable of communicating with computing device 102 via network 112.

Figure 2:
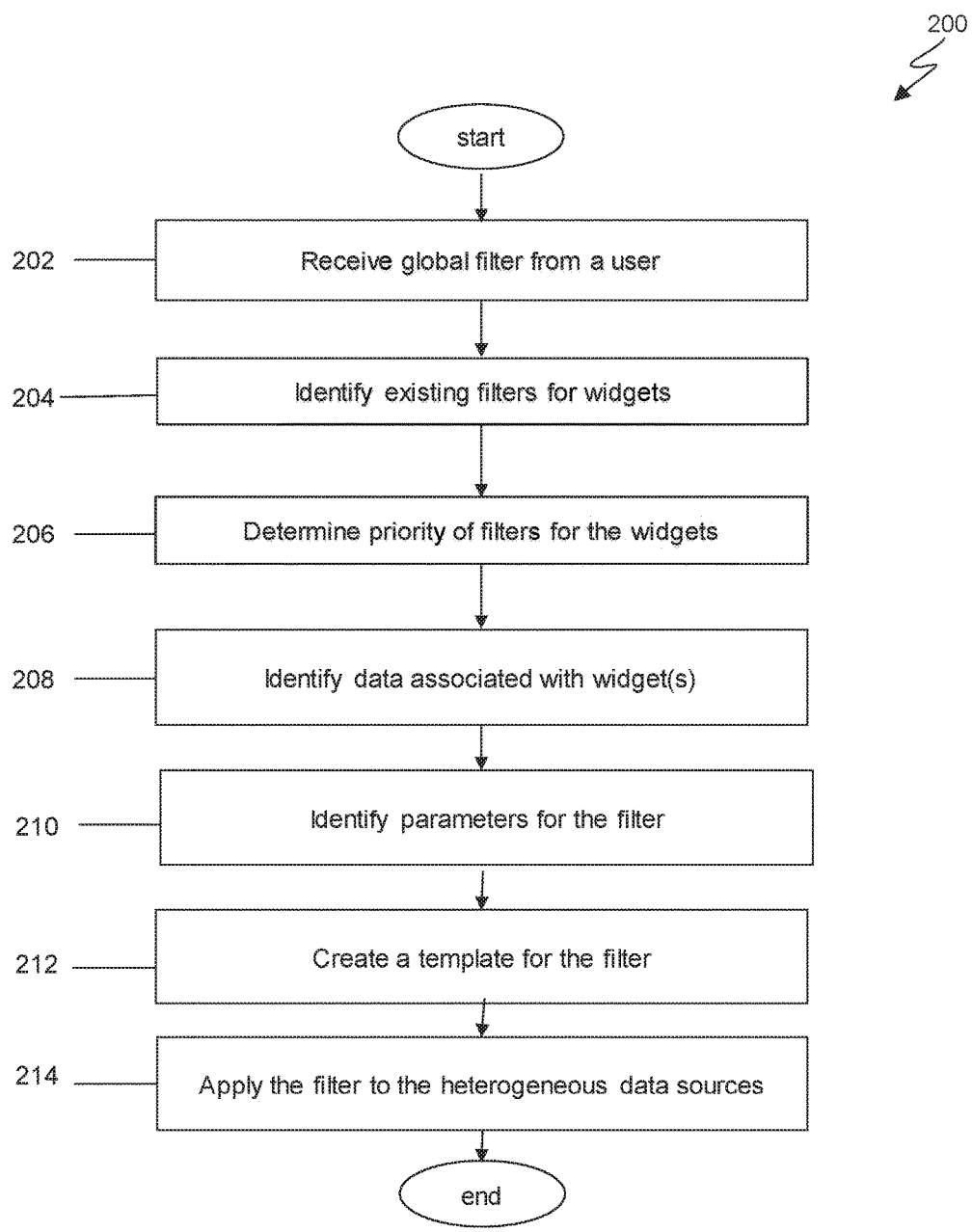
FIG. 2 depicts a flowchart depicting operational steps of a program for global filtering across heterogeneous datasets, executing within the computing system of FIG. 1, in accordance with one embodiment of the present invention.

FIG. 2 is a flowchart depicting operational steps of program 200, which is a function of query engine 120, in accordance with an embodiment of the present invention. In some embodiments, the operational steps of program 200 begin in response to a prompt from a user of query engine 120. In other embodiments, the operational steps of program 200 begin in response to a specific amount of time passing. In yet other embodiments, program 200 begins in response to receiving a change in a filter or user preference.

Program 200 receives a new filter via user input (step 202). In various embodiments, program 200 may receive a filter for widgets located on a computing device (e.g., computing device 102). In one embodiment, a user may enter a new filter, to be utilized across multiple widgets (e.g., a global filter). In other embodiments, a user may have a profile which controls various widgets a user has selected to utilize. The user may have various preset widgets to list, for example, the user may have one list that displays three widgets on a device (e.g., widgets 150 A, B, and N). In another example, the user may have another list for another computing device that displays more widgets because the other computing device has a larger screen. In some embodiments, the user may not have a profile, and any filter selection may apply to all possible widgets. In some examples a user may select a filter setting that will not apply to one or more widgets, and therefore, program 200 will disregard those widgets. A filter may be a time filter, a location filter, or other possible filters that a user may prefer. The user may set the filter for a select amount of widgets, all widgets, or just a specific widget. In some embodiments, the filter may not be new, but rather a change to an existing filter, or an update to a previous filter.

In some embodiments, a user may select a range as opposed to a specific number or word. In an example, a user may select a time frame such as within the last four hours. Program 200 may then adjust the filter to reflect a range by use of < or >. In another example, a user may select a distance range from a specific address, city, or zip code. Program 200 may again utilize <, >, or =. In some embodiments, program 200 may have multiple inputs for a filter such as multiple locations and may utilize a + in the filter.

Program 200 identifies existing filters for widgets (step 204). In various embodiments, program 200 identifies all filters associated with widgets. In some examples, program 200 identifies all filters for widgets from a selected user profile of step 202. In an example, a user may have a profile which contains 3 of 5 widgets on one computing device and 2 of 7 widgets on another computing device. In other examples, program 200 identifies all filters for widgets on the computing device of the user (e.g., computing device 102). In yet other embodiments, some widget filters may not be subject to change, and therefore, program 200 ignores those filters.

In some embodiments, program 200 identifies local and global filters for widgets. In an example, program 200 may identify local filters stored in a local database (e.g., local database 140). Local filters may include filters selected by a user of the device which employees the widgets, and examples may include a location, a time frame for refresh, or other specific filters a user might select. In some examples, program 200 may identify global filters for widgets, (e.g., query a global database, such as global database 160, to identify global filters, or query a data source). Global filters may include design specific filters based on a widget which may be set by administrators or creators of a widget, and may vary from widget to widget.

Program 200 determines the priority of filters for the widgets (step 206). In some embodiments, program 200 determines the priority of filters based upon inputs received from a user. For example, program 200 makes a filter the highest priority based upon the most recent filter selection. In another embodiment, a user may have preset priorities. For example, a user selected which filters may apply to each widget, and therefore, even a new filter may not take priority over an older filter.

In various embodiments, program 200 merges filters. In an example, program 200 receives a new filter based upon a time range to reduce data for widgets in step 202, and multiple widgets may have a time range interval selected. Program 200 has identified the filters for widgets that apply to a time range in step 204. Program 200 merges the filter from step 202 with all time range interval filters for widgets that are identified in step 204. For example, program 200 determines the priority for each time range interval filter for all filters. Program 200 then overrides any overlapping filters with lower priority and utilizes the new higher priority filter from step 202. In some examples, a widget or associated data on computing device 102 may not have a time range filter, and therefore, no time range interval filter is merged. In another embodiment, program 200 determines that the time range interval filter identified in step 204 for widget 150 A has priority over the new time range interval filter received in step 202. However, the new time range interval filter received in step 202 has priority over the time range interval filters identified in step 204 for widgets 150 B and N. Program 200 merges the new time range interval filter from step 202 with the identified time range interval filters from step 204 for widgets 150 B and N, but not widget 150 A.

Program 200 identifies data associated with widget(s) (step 208). In various embodiments, the data associated with the widgets may come from different data sources utilizing different schema. In an example, program 200 identifies the location of the user. In other examples, program 200 may identify a list of resources, a user or users, etc. which may come from different data sources with different schemas. In some embodiments, program 200 identifies data associated with widgets from data sources. For example, program 200 may identify data related to a widget in local database 140, global database 160, and from one or more data sources (not depicted) that support the widget. A server or servers that provide data to a widget may be queried for data, or program 200 may receive data and store the data in one or more databases (e.g., local database 140 and global database 160). Because different widgets may be created by different sources, the schema of the widget may be different. Program 200 identifies relevant data pertaining to the filter associated with the widgets. In some embodiments, program 200 may determine a filter is relevant based identified data of the filter (e.g., upon a code preface, or a keyword). In other embodiments, program 200 may determine relevance based upon preset identifiers that determine relatedness. In some embodiments, there may be a threshold relatedness which program 200 may have to exceed (e.g., 80% related) in order to determine that the filters are related. In yet other embodiments, program 200 may utilize cognitive computing or natural language processing to determine relatedness of filters between a new filter from step 202 and an existing filter for widgets located on computing device 102.

Program 200 identifies parameters for the filter (step 210). In various embodiments, program 200 identifies filter parameters for datasets previously identified. In some embodiments, program 200 adjusts the new filter identified in step 202 to a compatible filter for the associated data set of the widget. In an example, program 200 identifies that common fields or related fields of each widget related to the filter from step 202. In some examples, the common fields related to a filter (e.g., a time refresh filter) are of the same or similar schema, and program 200 merely identifies the related filters. In another example, program 200 identifies related fields (e.g., all filters related to time or related to similar subject matter). In an embodiment, program 200 searches for key words in information obtained from database or data sources, which relate to the word time. In another example, program 200 searches for similarities in the code of a widget to identify a similar filter. For example, program 200 may search for parameters, such as "isointerval". If only one type of parameter is found program 200 may utilize the parameter. If more than one parameter is found, program 200 may look for a parameter with the identification "time". If program 200 cannot locate and identification "time", program 200 may pick the first identified parameter.

Program 200 creates a template for the filter (step 212). In various embodiments, creates a template for the filter based upon the identified parameters of step 210. In an example, program 200 creates a template for the new filter which can be utilized by each widget. Program 200 determines a compatible format for the filter based upon information identified in steps 208 and 210. In some embodiments, program 200 may have previously created a filter for the same purpose which encompasses the same widgets. In such an embodiment, program 200 may identify a previously created template stored in a database (e.g., local database 140, global database 160, or any other database connected via network 112). In one example, program 200 may convert a time range into a dataset specific parameter and reinitialize the dataset. In some examples, program 200 may identify default filter parameters, which conflict with the selected new filter from step 202. In these examples, program 200 may ignore the previous default parameters and create a template which overrides the default parameters. In some embodiments, program 200 may transform or alter a filter so that the filter is compatible with one or more data sources for the previously identified widgets.

Program 200 applies the filter to the heterogeneous data sources (step 214). In various embodiments, program 200 creates a new filter which can be applied to multiple widgets regardless of schema. In an example, program 200 creates a location filter that restricts information updates to a specific geographical area based upon the template from step 212. Program 200 disseminates the new heterogeneous filter to all relevant widgets. In some embodiments, program 200, sends the new compatible filter to each data sources. In some examples, each widget (e.g., widgets 150 A, B, and N located on computing device 102) may receive information from separate servers (not depicted) dedicated to supporting and providing information for each independent widget. Program 200 sends the new filter information to each dedicated server which applies the filter to the information for the user of computing device 102. The dedicated server then sends information according to the newly applied filter. In some embodiments, program 200 has previously determine that a filter may not apply to a specific widget. Program 200 may only send the filter to supporting servers for widgets for which the filters apply. In another embodiment, program 200 may send the filter to all server regardless of whether the filter applies to the specific widget.

Figure 3:
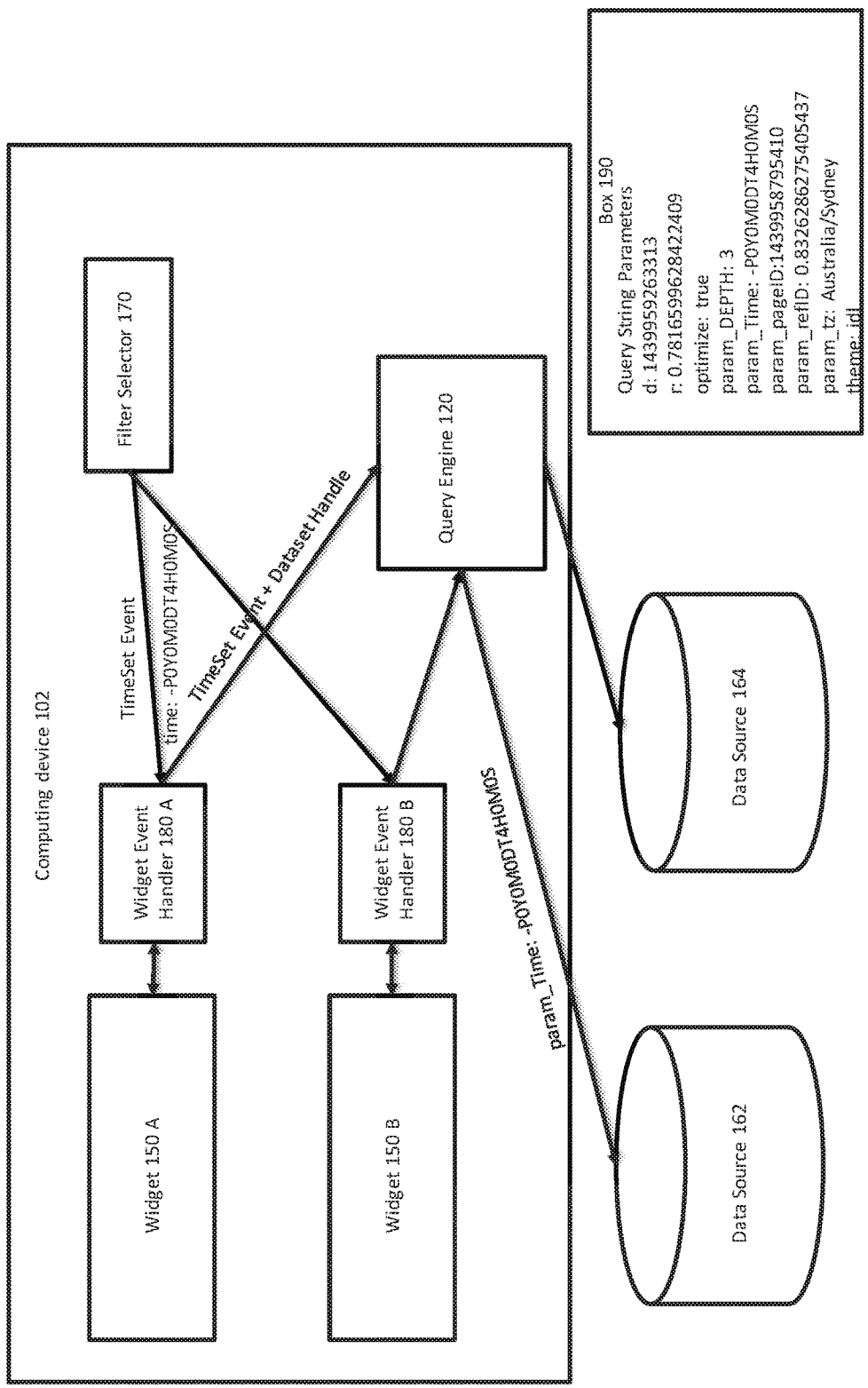
FIG. 3 is an example embodiment of a program for global filtering across heterogeneous datasets, executing within the computing system of FIG. 1, in accordance with one embodiment of the present invention.

FIG. 3 depicts an example embodiment of query engine 120. Computing device 102 contains widget 150 A and widget 150 B, widget event handlers 180 A and B respectively, query engine 120, filter selector 170, data source 162 and data source 164. In an example implementation of query engine 120, a user selects a filter (e.g., a time filter) from filter selector 170. A user may directly input a filter, select from preset filters, select from previously input filters, or select a default filter. In the depicted embodiment, a user selection of "now through the last four hours" is indicated. The information is sent to widget event handlers 180 A and B. Widget event handlers 180 A and B, may be subprograms, sub routines of query engine 120, or individual application program interfaces (APIs), or any other combination known in the art. In the depicted example, a filter selection of TimeSet Event/time: –P0Y0M0DT4H0M0S is sent to widget event handlers 180 A and B. Widget event handlers 180 A and B send TimeSet Event+Dataset Handle to query engine 120. Query engine 120 converts the time range to dataset specific parameters and reinitializes the dataset. Query engine 120 finds matching parameters by first finding parameters of time isointerval. If only one exists, then query engine 120 utilizes the parameter. If, more than one parameter exists, then query engine 120 identifies parameters with identification "time", and if "time" is not found, then query engine 120 utilizes the first parameter. If a default or user set value exists, query engine 120 overrides the setting temporarily. If no matching parameters are found by query engine 120 then query engine 120 ignores the event. In the depicted example, query engine 120 sends para_Time: –P0Y0M0DT4H0M0S to data source 162 and data source 164. An example of query string parameters are located in box 190.

Figure 4:
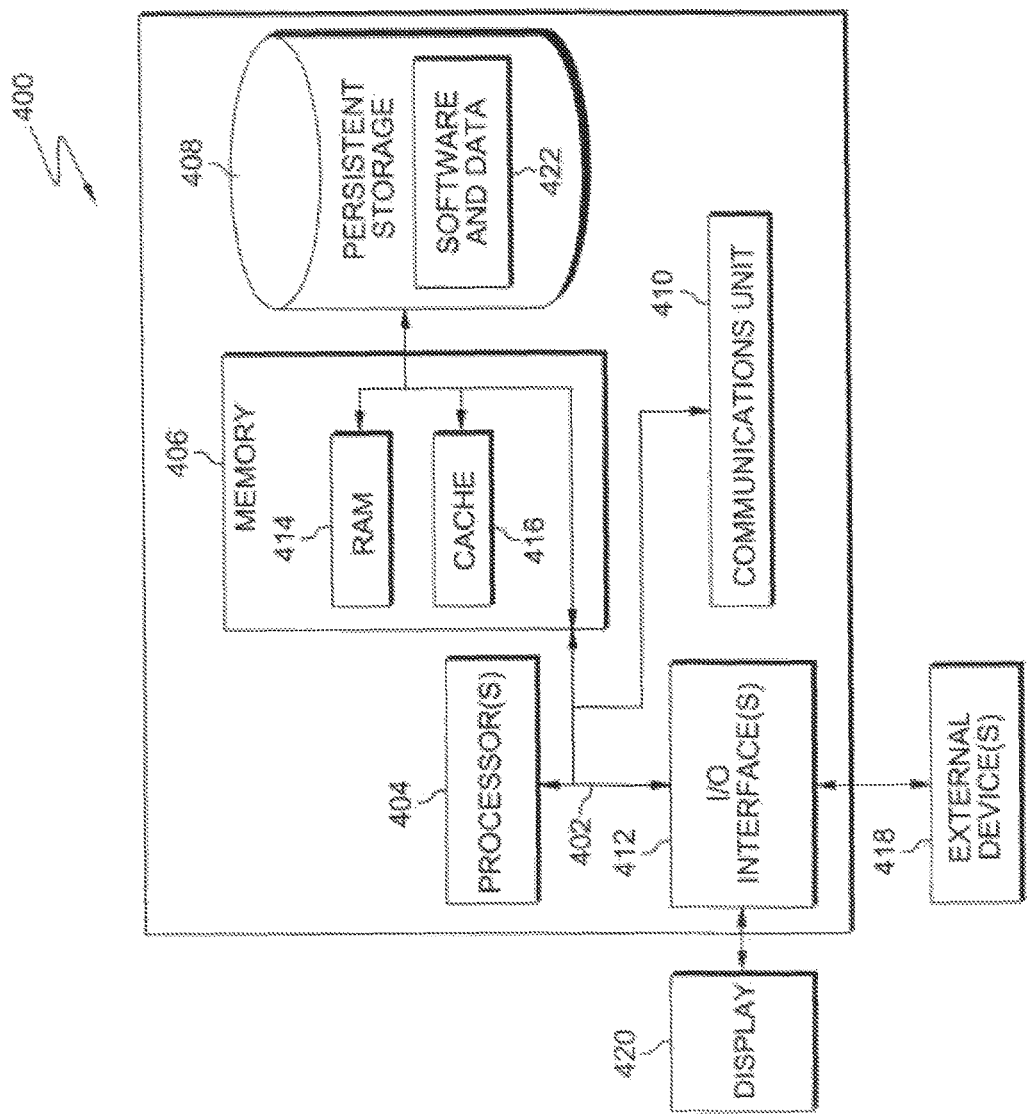
FIG. 4 depicts a block diagram of components of the server and/or the computing device of FIG. 1, in accordance with another embodiment of the present invention.

FIG. 4 depicts computer system 400, which is an example of a system that includes components of server 104 and/or computing device 102. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 306 may provide a connection to external device(s) 408, such as a keyboard, a keypad, and/or some other suitable input device. External device(s) 408 can also include portable computer readable storage media such as, for example, thumb drives, portable optical or magnetic disks, and memory cards. Software and data used to practice embodiments of the present invention, e.g., query engine 120, local database 140, global database 160, widgets 150 A, B, and N, and UI 130 can be stored on such portable computer readable storage media and can be loaded onto persistent storage 405 of computing device 102 via I/O interface(s) 406 of computing device 102. Software and data used to practice embodiments of the present invention, e.g., query engine 120, can be stored on such portable computer readable storage media and can be loaded onto persistent storage 405 of computing device 102 via I/O interface(s) 406 of computing device 102. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for global filtering across heterogeneous datasets, the method comprising:
    identifying, by one or more computer processors, one or more widgets on a computing device;
    identifying, by one or more computer processors, a new filter for the one or more widgets on the computing device;
    identifying, by one or more computer processes, one or more existing filters for the one or more widgets;
    determining, by one or more computer processors, if the new filter is relevant to the one or more widgets;
    identifying, by one or more computer processors, a compatible format for each of the identified filters based upon one or more data sets; and
    in response to determining if the new filter is relevant to the one or more widgets, generating, by one or more computer processors, a merged filter, based at least in part on the identified compatible format, for the relevant one or more widgets that includes at least a portion of the new filter and at least a portion of the one or more existing filters.

2. The method of claim 1, further comprising sending, by one or more computer processors, the generated merged filters to a data source for each one of the one or more widgets.

3. The method of claim 1, wherein generating, by one or more computer processors, a merged filter, based at least in part on the identified compatible format, for the relevant one or more widgets that includes at least a portion of the new filter and at least a portion of the one or more existing filters further comprises:
    identifying, by one or more computer processors, a priority for each one of the one or more existing filters and the new filter; and
    generating, by one or more computer processors, the merged filter based at least in part on the identified priority for each of the one or more existing filters and the new filter.

4. The method of claim 1, wherein generating, by one or more computer processors, a merged filter, based at least in part on the identified compatible format, for the relevant one or more widgets that includes at least a portion of the new filter and at least a portion of the one or more existing filters further comprises:
    identifying, by one or more computer processors, one or more data sets for each of the identified existing filters; and
    generating, by one or more computer processors, the merged filter to encompass one or more existing filters for the one or more identified relevant widgets based upon the identified compatible format.

5. The method of claim 1, wherein identifying, by one or more computer processors, a new filter for the one or more widgets on the computing device further comprises:
    identifying, by one or more computer processors, a range input from a user as a filter; and
    creating, by one or more computer processors, the new filter based on a range input.

6. The method of claim 1, further comprising:
    identifying, by one or more computer processors, one or more commonly used merged filters; and
    storing, by one or more computer processors, the identified one or more commonly used merged filters.

7. The method of claim 1, wherein determining, by one or more computer processors, if the new filter is relevant to the one or more widgets comprises:
    identifying, by one or more computer processors, existing filters for the one or more widgets;
    identifying, by one or more computer processors, if the existing filters have similar subject matter; and
    determining, by one or more computer processors, if the new filter is relevant based upon the subject matter similarity.

8. The method of claim 1, further comprises:
    identifying, by one or more computer processors, one or more merged filters for the one or more widgets;
    identifying, by one or more computer processors, a transformed filter that is compatible with associated subject matter; and
    determining, by one or more computer processors, if the new filter is compatible with a dataset associated with the relevant one or more widgets based on the identified one or more merged filters and the identified transformed filter.

9. A computer program product for global filtering across heterogeneous datasets, the computer program product comprising:
    one or more computer readable storage media and program instructions stored on the one or more computer readable storage media, the program instructions comprising:
    program instructions to identify one or more widgets on a computing device;
    program instructions to identify a new filter for the one or more widgets on the computing device;
    program instructions to identify one or more existing filters for the one or more widgets;
    program instructions to determine if the new filter is relevant to the one or more widgets;
    program instructions to identify a compatible format for each of the identified filters based upon one or more data sets; and
    in response to determining if the new filter is relevant to the one or more widgets, program instructions to generate a merged filter, based at least in part on the identified compatible format, for the relevant one or more widgets that includes at least a portion of the new filter and at least a portion of the one or more existing filters.

10. The computer program product of claim 9, further comprising program instructions to send the generated merged filters to a data source for each one of the one or more widgets.

11. The computer program product of claim 9, wherein program instructions to generate a merged filter, based at least in part on the identified compatible format, for the relevant one or more widgets that includes at least a portion of the new filter and at least a portion of the one or more existing filters further comprises program instructions to:
identify a priority for each one of the one or more existing filters and the new filter; and
generate the merged filter based at least in part on the identified priority for each of the one or more existing filters and the new filter.

12. The computer program product of claim 9, wherein program instructions to generate a merged filter, based at least in part on the identified compatible format, for the relevant one or more widgets that includes at least a portion of the new filter and at least a portion of the one or more existing filters further comprises program instructions to:
identify one or more data sets for each of the identified existing filters; and
generate the merged filter to encompass one or more existing filters for the one or more identified relevant widgets based upon the identified compatible format.

13. The computer program product of claim 9, wherein program instructions to identify a new filter for the one or more widgets on the computing device further comprises program instructions to:
identify a range input from a user as a filter; and
create the new filter based on a range input.

14. The computer program product of claim 9, further comprising program instructions to:
identify one or more commonly used merged filters; and
store the identified one or more commonly used merged filters.

15. A computer system for global filtering across heterogeneous datasets, the computer system comprising:
one or more computer processors;
one or more computer readable storage media;
program instructions stored on the computer readable storage media for execution by at least one of the one or more computer processors, the program instructions comprising:
program instructions to identify one or more widgets on a computing device;
program instructions to identify a new filter for the one or more widgets on the computing device;
program instructions to identify one or more existing filters for the one or more widgets;
program instructions to determine if the new filter is relevant to the one or more widgets;
program instructions to identify a compatible format for each of the identified filters based upon one or more data sets; and
in response to determining if the new filter is relevant to the one or more widgets, program instructions to generate a merged filter, based at least in part on the identified compatible format, for the relevant one or more widgets that includes at least a portion of the new filter and at least a portion of the one or more existing filters.

16. The computer system of claim 15, further comprising program instructions to send the generated merged filters to a data source for each one of the one or more widgets.

17. The computer system of claim 15, wherein program instructions to generate a merged filter, based at least in part on the identified compatible format, for the relevant one or more widgets that includes at least a portion of the new filter and at least a portion of the one or more existing filters further comprises program instructions to:
identify a priority for each one of the one or more existing filters and the new filter; and
generate the merged filter based at least in part on the identified priority for each of the one or more existing filters and the new filter.

18. The computer system of claim 15, wherein program instructions to generate a merged filter, based at least in part on the identified compatible format, for the relevant one or more widgets that includes at least a portion of the new filter and at least a portion of the one or more existing filters further comprises program instructions to:
identify one or more data sets for each of the identified existing filters; and
generate the merged filter to encompass one or more existing filters for the one or more identified relevant widgets based upon the identified compatible format.

19. The computer system of claim 15, wherein program instructions to determine if the new filter is relevant to the one or more widgets comprises program instructions to:
identify existing filters for the one or more widgets;
identify if the existing filters have similar subject matter; and
determine if the new filter is relevant based upon the subject matter similarity.

20. The computer system of claim 15, further comprises program instructions to:
identify one or more merged filters for the one or more widgets;
identify a transformed filter that is compatible with associated subject matter; and
determine if the new filter is compatible with a dataset associated with the relevant one or more widgets based on the identified one or more merged filters and the identified transformed filter.

* * * * *